United States Patent
Nanaumi

(10) Patent No.: US 10,810,711 B2
(45) Date of Patent: Oct. 20, 2020

(54) INFORMATION PROCESSING APPARATUS, STORAGE MEDIUM, AND INFORMATION PROCESSING METHOD

(71) Applicant: CANON KABUSHIKI KAISHA, Tokyo (JP)

(72) Inventor: Yoshihito Nanaumi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 85 days.

(21) Appl. No.: 16/018,658

(22) Filed: Jun. 26, 2018

(65) Prior Publication Data
US 2019/0005627 A1 Jan. 3, 2019

(30) Foreign Application Priority Data
Jun. 29, 2017 (JP) ................. 2017-128039

(51) Int. Cl.
*G06T 5/00* (2006.01)
*G06T 7/73* (2017.01)
*G06T 3/00* (2006.01)

(52) U.S. Cl.
CPC ............ *G06T 5/006* (2013.01); *G06T 3/00* (2013.01); *G06T 7/75* (2017.01); *G06T 2207/20061* (2013.01); *G06T 2207/30176* (2013.01)

(58) Field of Classification Search
CPC .. G06T 5/006; G06T 3/00; G06T 7/75; G06T 2207/20061; G06T 2207/30176
See application file for complete search history.

(56) References Cited

U.S. PATENT DOCUMENTS

| 6,361,171 | B1* | 3/2002 | Ejiri ................. | G03B 21/14 348/744 |
| 6,450,647 | B1* | 9/2002 | Takeuchi ............ | H04N 5/74 353/69 |
| 7,268,803 | B1* | 9/2007 | Murata .............. | G06T 3/4038 348/218.1 |
| 2003/0002751 | A1* | 1/2003 | Sun ................. | G06T 3/00 382/293 |
| 2005/0024597 | A1* | 2/2005 | Kubo ................ | H04N 5/74 353/69 |
| 2006/0188172 | A1* | 8/2006 | Higurashi .......... | G06T 5/006 382/275 |

(Continued)

FOREIGN PATENT DOCUMENTS

JP 10-079878 A 3/1998
JP 2016-139334 A 8/2016

*Primary Examiner* — Nizar N Sivji
(74) *Attorney, Agent, or Firm* — Canon U.S.A., Inc. IP Division

(57) ABSTRACT

In an information processing apparatus and method, first information necessary for distortion correction is detected from a first captured image. Then, transformation information (transformation matrix) for use in coordinate transformation between coordinate systems of respective two different captured images is calculated based on feature points on the respective two different captured images. The detected first information is transformed using the calculated transformation information (the transformation matrix) into second information necessary for distortion correction on a second captured image, and the distortion correction is executed on the second captured image based on the transformed second information.

4 Claims, 17 Drawing Sheets

(56) References Cited

U.S. PATENT DOCUMENTS

| | | | |
|---|---|---|---|
| 2007/0171288 A1* | 7/2007 | Inoue | G06T 1/0064 348/241 |
| 2009/0002523 A1* | 1/2009 | Maekawa | G06T 3/00 348/231.2 |
| 2013/0182002 A1* | 7/2013 | Macciola | G06K 9/00463 345/589 |
| 2015/0146020 A1* | 5/2015 | Imaizumi | G06K 9/22 348/207.1 |
| 2015/0369593 A1* | 12/2015 | Myllykoski | G06T 7/73 348/136 |
| 2017/0316275 A1* | 11/2017 | Miyauchi | G06T 1/0007 |

* cited by examiner

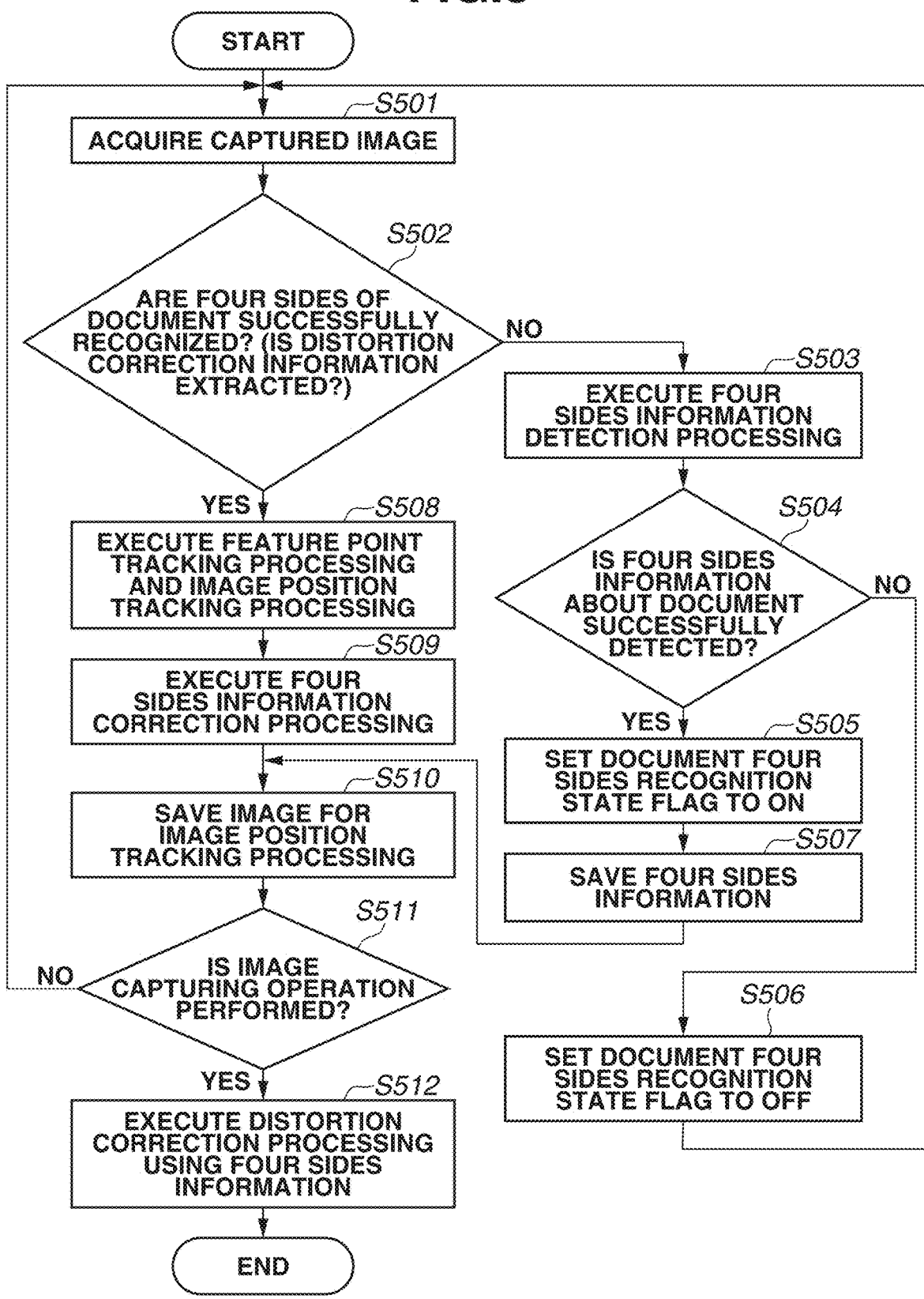

INFORMATION PROCESSING APPARATUS, STORAGE MEDIUM, AND INFORMATION PROCESSING METHOD

BACKGROUND OF THE INVENTION

Field of the Invention

The present disclosure relates to distortion correction of a document region contained in a captured image.

Description of the Related Art

In recent years, a mobile terminal such as a smartphone and a tablet personal computer (PC) with advanced information processing functions are popularly used. The mobile terminal is equipped with a camera and includes an image capturing function (camera function). An opportunity to capture an image of a sheet-medium document using the camera function of a mobile terminal and to save the acquired document image as image data on a memory of the mobile terminal has increased. In capturing of a document image using the camera function of a mobile terminal, it is difficult to capture a document image from the front such that an entire document is positioned across the captured image without distortion, unlike document scans with a flatbed scanner or a multi-function peripheral. Further, it is undesirable to copy or convert such a captured image into a data file, because there can be a case in which the captured image contains extra information other than the document content or a case in which the document image is captured from an oblique direction to cause the image of the document content to be distorted geometrically. In such cases, it is necessary to cut only a document content region (document region) and perform distortion correction (also referred to as "trapezoidal correction") on the cut document region to remove the geometrical distortion before the captured image is copied or converted into a data file. Japanese Patent Application Laid-Open No. 10-079878 discusses a technique in which distortion correction is performed on a document region using information such as a ruled line image and a character image. Further, Japanese Patent Application Laid-Open No. 2016-139334 discusses a technique in which the four sides of a document are detected, and distortion correction is performed based on the detected quadrilateral.

When optical character recognition (OCR) processing is to be performed on a captured image of a document, if an image of the document is captured with a camera positioned near the document, the resolution of character regions of an OCR target increases and defocusing of image details is prevented so that the accuracy of OCR improves. However, when an image of a part of the document is captured with the camera positioned near the document, if the technique discussed in Japanese Patent Application Laid-Open No. 10-079878 in which distortion correction is performed on a document image using information such as a ruled line image and a character image is applied, there arises an issue that the technique discussed in Japanese Patent Application Laid-Open No. 2016-139334 in which distortion correction is performed based on the four sides of the document is not directly applicable, since no image of the four sides of the document is captured.

SUMMARY OF THE INVENTION

According to an aspect of the present disclosure, an information processing apparatus includes a processor, and a memory that stores instructions, wherein the processor executes the instructions to perform detecting first information necessary for distortion correction from a first captured image, calculating transformation information for use in coordinate transformation between coordinate systems of respective two different captured images based on feature points on the respective two different captured images, transforming the detected first information into second information necessary for distortion correction on a second captured image using the transformation information, and executing distortion correction on the second captured image based on the second information.

Further features of the present disclosure will become apparent from the following description of exemplary embodiments with reference to the attached drawings.

BRIEF DESCRIPTION OF THE DRAWINGS

FIG. 5 illustrates a flowchart of document distortion correction processing.

DESCRIPTION OF THE EMBODIMENTS

Figure 1:
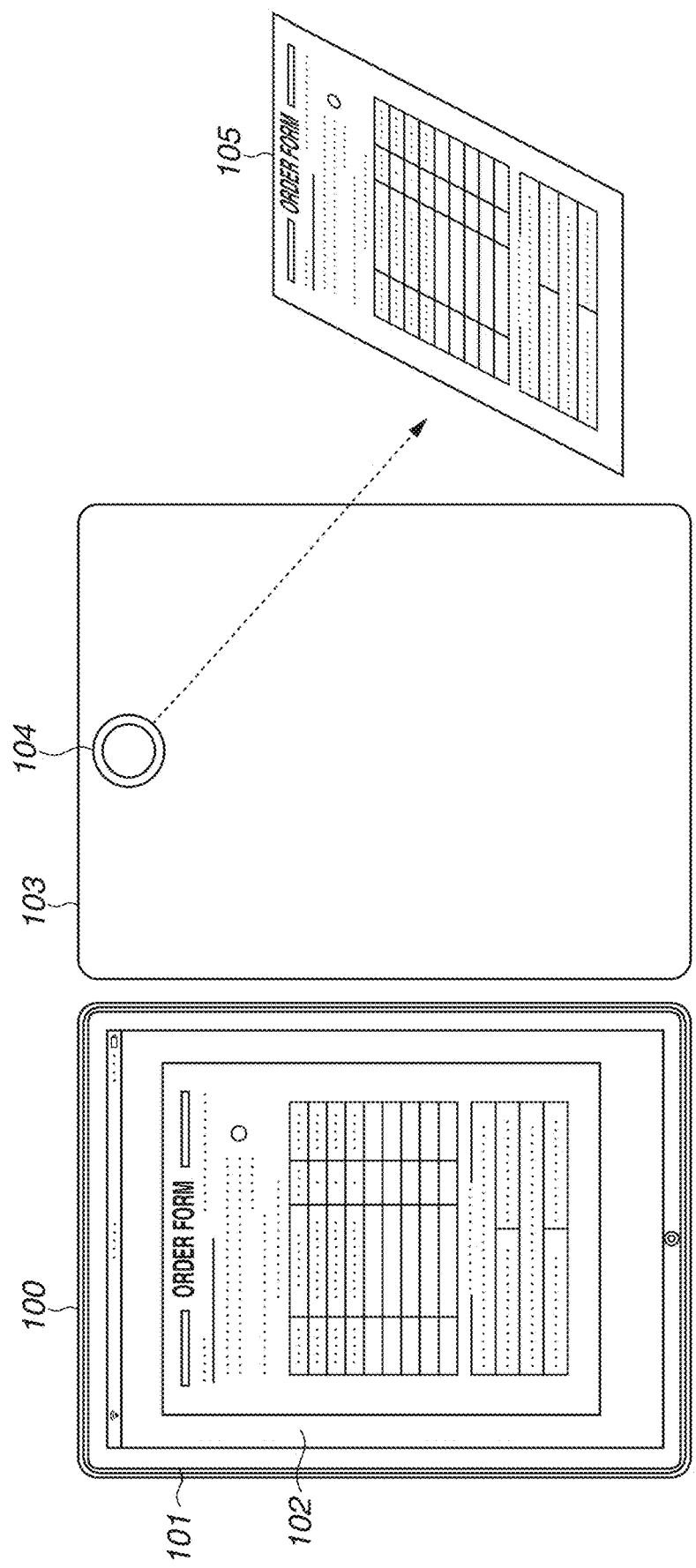
FIG. 1 illustrates an example of an external view of a mobile terminal.

A mobile terminal with a camera function will be described below as an example of an information processing apparatus according to a first exemplary embodiment of the present disclosure. FIG. 1 illustrates an example of an external view of the mobile terminal. A mobile terminal 100 includes various units (101 to 104). The mobile terminal 100 has a front surface portion 101 on which a touch panel 102 is provided. The touch panel 102 has a function as a display (display unit) for displaying information such as an image (moving image) and a function as an input unit for inputting an instruction according to a touch operation of a user. Further, the mobile terminal 100 has a back surface portion 103 provided with a camera 104 for capturing an image of a subject 105 such as a sheet document and for acquiring the captured image. The user of the mobile terminal 100 activates a mobile application (mobile app), which will be described below, and captures an image of the subject 105 using the camera 104 to start processing. The subject 105 in FIG. 1 is an order form of an A4-size sheet document. The subject 105 is not limited to A4-size sheet document, and documents of various sizes can be set as a target. The mobile application described below can acquire an image of the subject 105 using the camera 104, and display and output the image on the touch panel 102.

Figure 2:
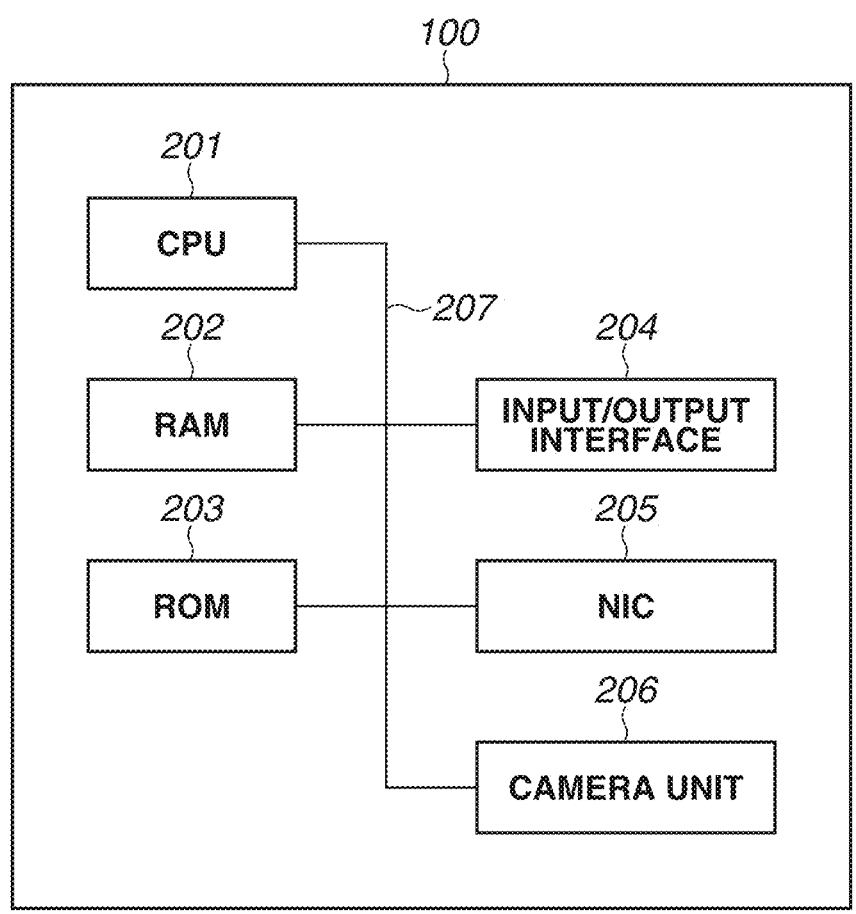
FIG. 2 illustrates an example of a hardware configuration of the mobile terminal.
Figure 3:
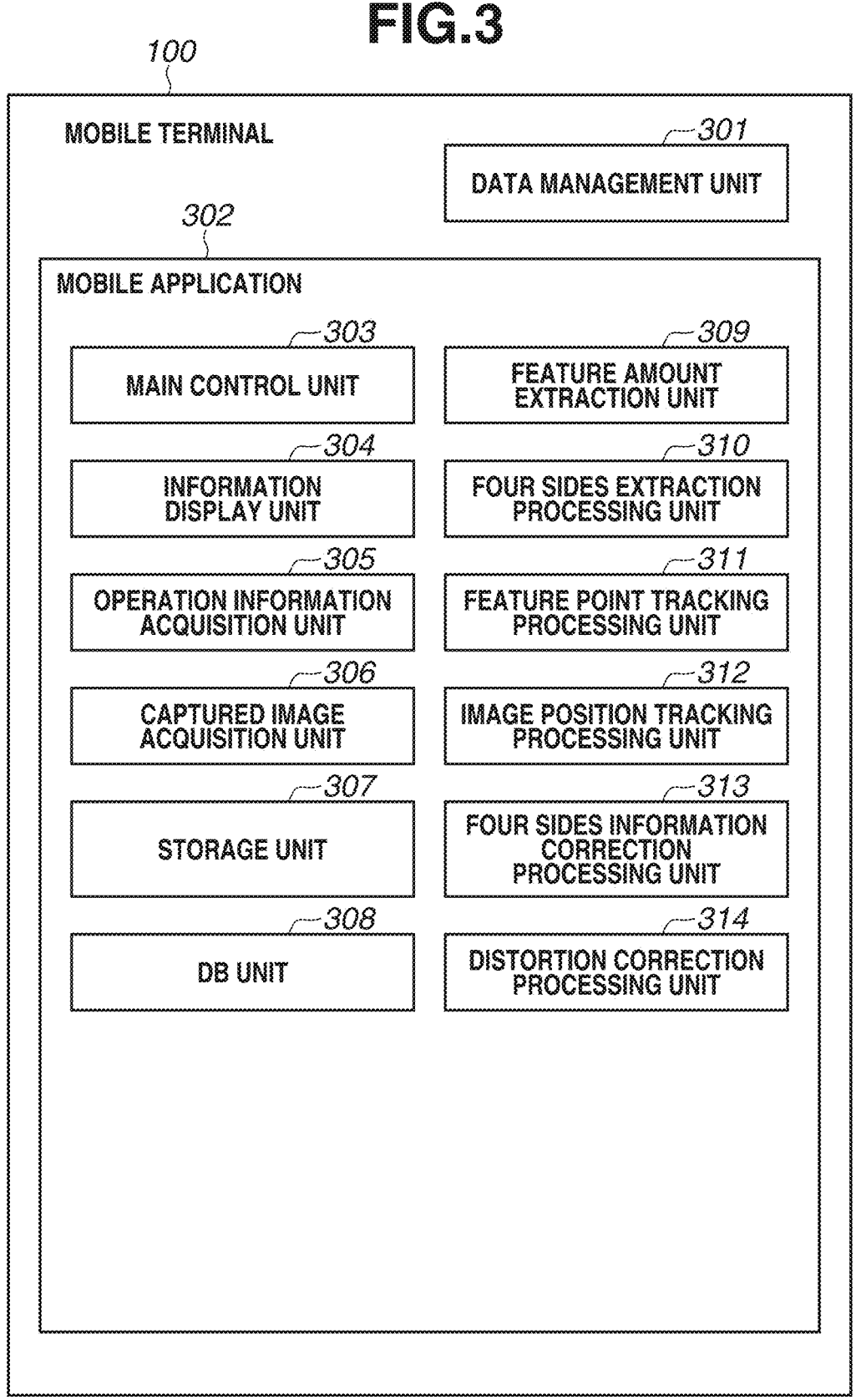
FIG. 3 illustrates an example of a software configuration of the mobile terminal.

FIG. 2 illustrates an example of a hardware configuration of the mobile terminal 100. The mobile terminal 100 includes various units (201 to 207). A central processing unit (CPU) 201 is a unit (computer) configured to execute various programs to realize various functions. A random access memory (RAM) 202 is a unit configured to store various types of information. Further, the RAM 202 is a unit which is also used as a temporary work storage area of the CPU 201. A read-only memory (ROM) 203 is a storage medium configured to store various programs, etc. The ROM 203 can be a storage medium such as a flash memory, a solid state disk (SSD), or a hard disk drive (HDD). The CPU 201 loads a program stored in the ROM 203 into the RAM 202 to execute the program. In this way, the CPU 201 functions as processing units of a mobile application as illustrated in FIG. 3 and executes the processing of each step in a flowchart described below. All or some of the functions of the processing units of the mobile application and the processing in the flowcharts described below can be realized not only by the CPU 201 but also by use of dedicated hardware.

An input/output interface 204 transmits and receives data to and from the touch panel 102. A network interface card (NIC) 205 is a unit configured to connect the mobile terminal 100 to a network (not illustrated). A camera unit 206 connects to the camera 104 to retrieve an image of the subject 105 into the mobile terminal 100. Each of the above-described units is configured to be able to transmit and receive data via a bus 207.

FIG. 3 illustrates a software configuration of the mobile terminal 100. A program for realizing functional processing units (module units) of the mobile application illustrated in FIG. 3 is stored in the ROM 203, etc. An operating system (OS) (not illustrated) of the mobile terminal 100 includes a data management unit 301.

The data management unit 301 manages images and application data. The OS provides a control application programming interface (API) for using the data management unit 301. The mobile application uses the control API to acquire and save the images and the application data managed by the data management unit 301.

A mobile application 302 is an application downloaded from an application store of the OS and installed using an installation function of the OS of the mobile terminal 100. The mobile application 302 performs various types of data processing on an image of the subject 105 that is retrieved via the camera unit 206.

A main control unit 303 is a control unit configured to control an application (mobile application) 302 for the mobile terminal 100, and controls module units (304 to 314) in coordination.

Figure 4:
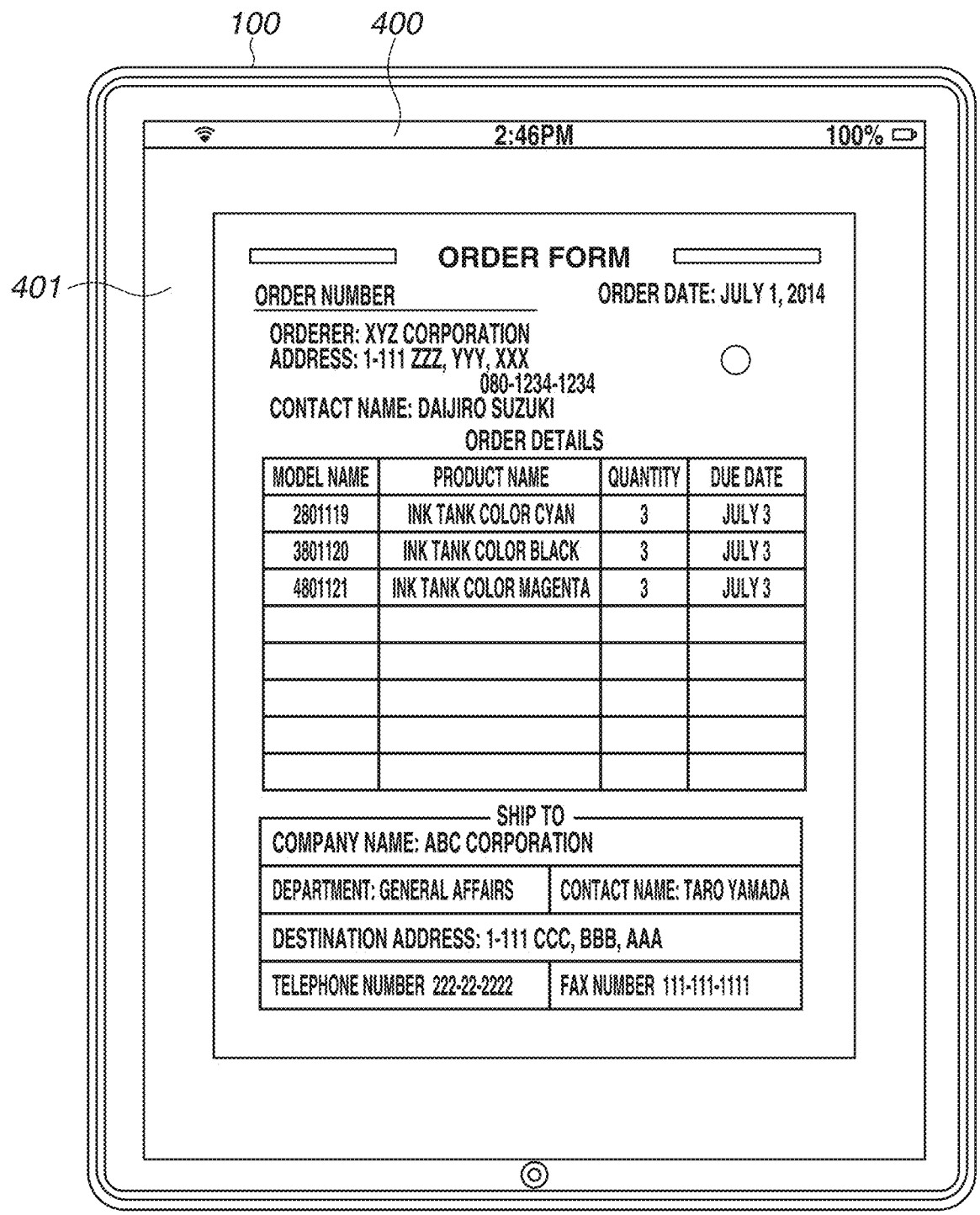
FIG. 4 illustrates an example of a user interface (UI) of a mobile application.

An information display unit 304 displays a UI of the mobile application 302 on a screen to provide the UI to the user according to an instruction from the main control unit 303. FIG. 4 is an example of a screen (mobile terminal screen 400) for providing the UI (UI for mobile terminal) of the mobile application 302. The mobile terminal screen 400 is displayed on the touch panel 102 of the mobile terminal 100. Further, an image retrieved via the camera 104 is displayed in a region 401 for displaying and performing operations on the mobile terminal screen 400, and operations (user operations) on the image, etc. by the user are received via the displayed UI. The form (position, size, range, location, displayed content, etc.) of the UI of the mobile application 302 is not limited to that illustrated in FIG. 4, and any appropriate configuration capable of realizing processing described below can be employed.

An operation information acquisition unit 305 acquires information indicating contents of a user operation via the UI displayed by the information display unit 304 and notifies the main control unit 303 of the acquired information. For example, if the region 401 is touched by a hand of the user, the operation information acquisition unit 305 detects information about the position of the touch on the screen and transmits the detected position information to the main control unit 303.

A captured image acquisition unit 306 acquires a captured image such as a moving image captured via the camera unit 206 and transmits the acquired captured image to a storage unit 307. The storage unit 307 stores the captured image acquired by the captured image acquisition unit 306. Further, the storage unit 307 can delete the stored captured image in response to an instruction from the main control unit 303.

A database (DB) unit 308 includes a database function and stores information about an image capturing target document (e.g., information about a form size of the image capturing target, information about an OCR processing target region in the form, etc.) and temporary information managed by the mobile application 302.

A feature amount extraction unit 309 extracts feature amounts from the captured image acquired via the camera unit 206 or the image temporarily stored in the storage unit 307. For example, portions (edges) with a significant change in luminance on an image and the like are determined as feature pixel points (feature points), and data (feature amount) representing the features of the feature points is calculated. Examples of a method of obtaining a feature point and a feature amount of the feature point include the scale-invariant feature transform (SIFT) and speeded-up robust features (SURF).

A four sides extraction processing unit 310 detects edge portions of the document (four sides of the document) from the captured image acquired via the camera unit 206 based on the information about the portions (edges) with a significant change in luminance, etc. to acquire four sides information (e.g., information about the coordinates of vertexes of a quadrilateral).

A feature point tracking processing unit 311 performs feature point tracking processing (optical flow) in which the feature points are extracted by the feature amount extraction unit 309 from the captured image (original image) of a first frame captured as a moving image and movement positions of the feature points on the captured image of a second frame which is a comparison target are estimated. The feature point tracking processing estimates movement vectors indicating the directions in which the feature points on the original image move on the comparison target image and the amounts by which the feature points on the original image move on the comparison target image. In this way, the positions to which the feature points on the original image move on the comparison target image can be estimated.

An image position tracking processing unit 312 calculates a homography transformation matrix (hereinafter, "transformation matrix") for performing homography transformation (homography transform, plane projection transformation) between two images (e.g., captured images of the first and the second frames) to perform positioning between the images. The homography transformation can transform a point on a plane coordinate system and moves the point onto a different plane coordinate system. Affine transformation which rotates, moves parallel, enlarges, or reduces an image is similar to the homography transformation, but the homography transformation is additionally capable of changing the enlargement/reduction rate according to the coordinate position to enable a trapezoidal transformation. The homography transformation is represented by a formula below using a coordinate point (x1, y1) on an image of a transformation source, a coordinate point (x2, y2) on an image of a transformation destination, a transformation matrix H, and a constant s. The mathematical formula of the transformation matrix is not limited to the expression by the mathematical equation (determinant) below and can be in any other form of a transformation equation for transforming the coordinate systems of two images. The transformation equation (transformation matrix) is used as transformation information in the transformation of the coordinate systems of two images.

$$H\begin{pmatrix} x_1 \\ y_1 \\ 1 \end{pmatrix} = \begin{pmatrix} h_{11} & h_{12} & h_{13} \\ h_{21} & h_{22} & h_{23} \\ h_{31} & h_{32} & 1 \end{pmatrix} \begin{pmatrix} x_1 \\ y_1 \\ 1 \end{pmatrix} = \begin{pmatrix} s \cdot x_2 \\ s \cdot y_2 \\ s \end{pmatrix}$$

In a case where feature points extracted from the same object exist between two images, a parameter of the transformation matrix H is calculated based on the coordinates of the corresponding points between the images which have been obtained by the matching processing performed by the feature point tracking processing unit 311. This makes it possible to obtain a transformation matrix between the two images to map the coordinates in the first image in the second image, and to obtain an inverse matrix of the transformation matrix to perform inverse mapping.

A four sides information correction processing unit 313 corrects four sides information (coordinates of the vertexes of the quadrilateral) about the document detected from the captured image (original image) of the entire document onto the coordinate system on the captured image (enlarged partial image) of the comparison target using the transformation matrix obtained by the image position tracking processing unit 312.

A distortion correction processing unit 314 obtains distortion correction information (distortion correction parameter) based on the four sides information about the document region corrected onto the coordinate system on the captured image by the four sides information correction processing unit 313 and output image size information (form size information), and performs distortion correction on the captured image using the distortion correction information.

A flow of the document distortion correction processing according to the present exemplary embodiment of the present disclosure, which is realized by the CPU 201 of the mobile terminal 100 through execution of the mobile application 302, will be described below with reference to FIG. 5. Activation of the mobile application 302 in the mobile terminal 100 in response to a user's operation to acquire a captured image (moving image) of the subject 105 via the camera 104 triggers a start of the flowchart.

In step S501, the captured image acquisition unit 306 acquires a captured image via the camera unit 206.

In step S502, the main control unit 303 determines whether the four sides of a document region are successfully recognized by determining whether a document four sides recognition state flag is ON. In a case where the document four sides recognition state flag is ON (YES in step S502), the main control unit 303 determines that the four sides of the document region are successfully recognized, and the processing proceeds to step S508. On the other hand, in a case where the document four sides recognition state flag is OFF (NO in step S502), the main control unit 303 determines that the four sides of the document region are not successfully recognized, and the processing proceeds to step S503.

In step S503, the four sides extraction processing unit 310 executes four sides information detection processing to detect the four sides of the document. Details of the four sides information detection processing in step S503 will be described below with reference to FIGS. 6A to 6C. First, the four sides extraction processing unit 310 detects a candidate line group of candidates for the four sides of the document region in the captured image, and identifies a quadrilateral region that is most likely the four sides of the document region based on the detected candidate line group of candidates for the four sides of the document region. FIG. 6A illustrates a captured image 600 obtained when an image of an entire document is captured. The captured image 600 contains a document region 601 which indicates the quadrilateral region of the document. FIG. 6B is an image which displays the candidate line group for the four sides superimposed on the captured image 600. The candidate line group for the four sides is acquired as follows. Specifically, the captured image 600 is transformed into an edge image (image indicating information as to whether each pixel is an edge pixel with a significant change in luminance), and straight line portions formed by the edge pixels are detected using a publicly-known method such as a Hough transformation algorithm on the edge image. The detected candidate line group also contains lines representing something other than the four sides of the document region such as a candidate line 602. From the candidate line group, candidate lines 603, 604, 605, and 606 are identified which are most likely to constitute the upper, right, lower, and left sides of the document region. As to a method of identifying the candidate lines 603, 604, 605, and 606 as the four sides of the document region from the candidate line group as first candidates, a quadrilateral formed by arbitrary four candidate lines is evaluated to identify the candidate lines. The evaluation of a quadrilateral formed by arbitrary four candidate lines can be performed based on, for example, geometric information such as the opposite side length ratio, internal angle size, and aspect ratio. Further, a comparison of image details such as color and dispersion between the inside and the outside can also be taken into consideration in the evaluation.

Figure 6C:
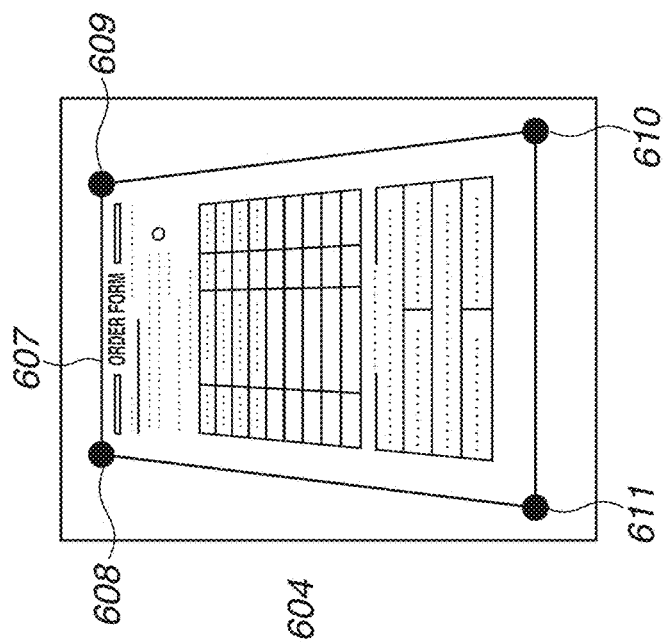
FIGS. 6A, 6B, and 6C illustrate an example of four sides information extraction processing.
Figure 6B:
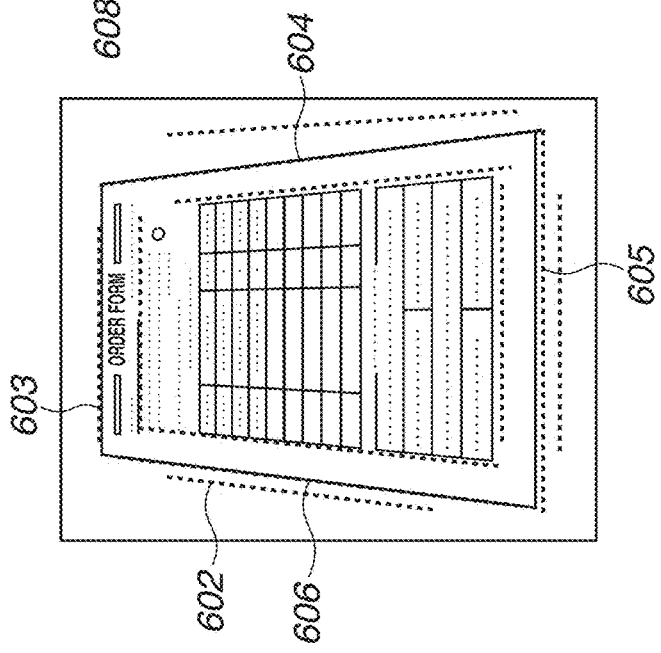
Figure 6A:
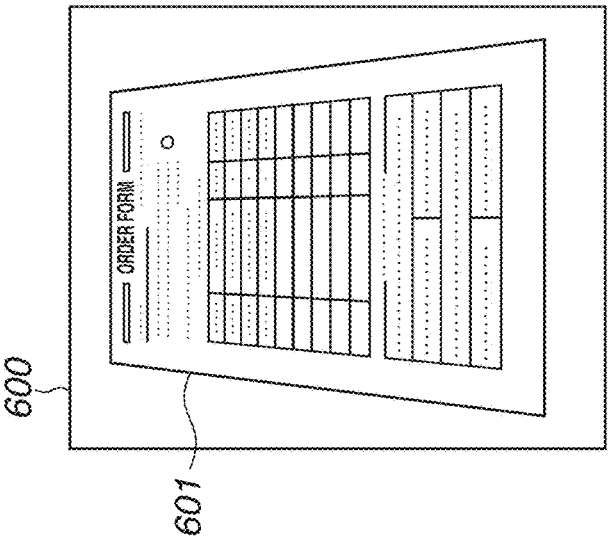

FIG. 6C is an image indicating the state in which a quadrilateral region 607 identified as a document region from the candidate line group is displayed on the captured image 600. The quadrilateral region 607 is a quadrilateral region that is formed when the candidate lines 603, 604, 605, and 606 are identified as the four sides, and is the quadrilateral region surrounded by the lines connecting vertexes 608, 609, 610, and 611 (hereinafter, referred to as "four sides information").

In step S504, the main control unit 303 determines whether the four sides extraction processing unit 310 successfully detects the four sides information about the document in step S503. In a case where the main control unit 303 determines that the four sides information is successfully detected (YES in step S504), the processing proceeds to step S505. In step S505, the main control unit 303 sets the document four sides recognition state flag to ON. On the other hand, in a case where the main control unit 303 determines that the four sides information is not successfully detected (NO in step S504), the processing proceeds to step S506. In step S506, the main control unit 303 sets the document four sides recognition state flag to OFF.

In step S507, the main control unit 303 saves the detected four sides information (coordinate information about the vertexes 608, 609, 610, and 611 of the four sides of the document) in the DB unit 308 in association with the captured image.

Figure 7:
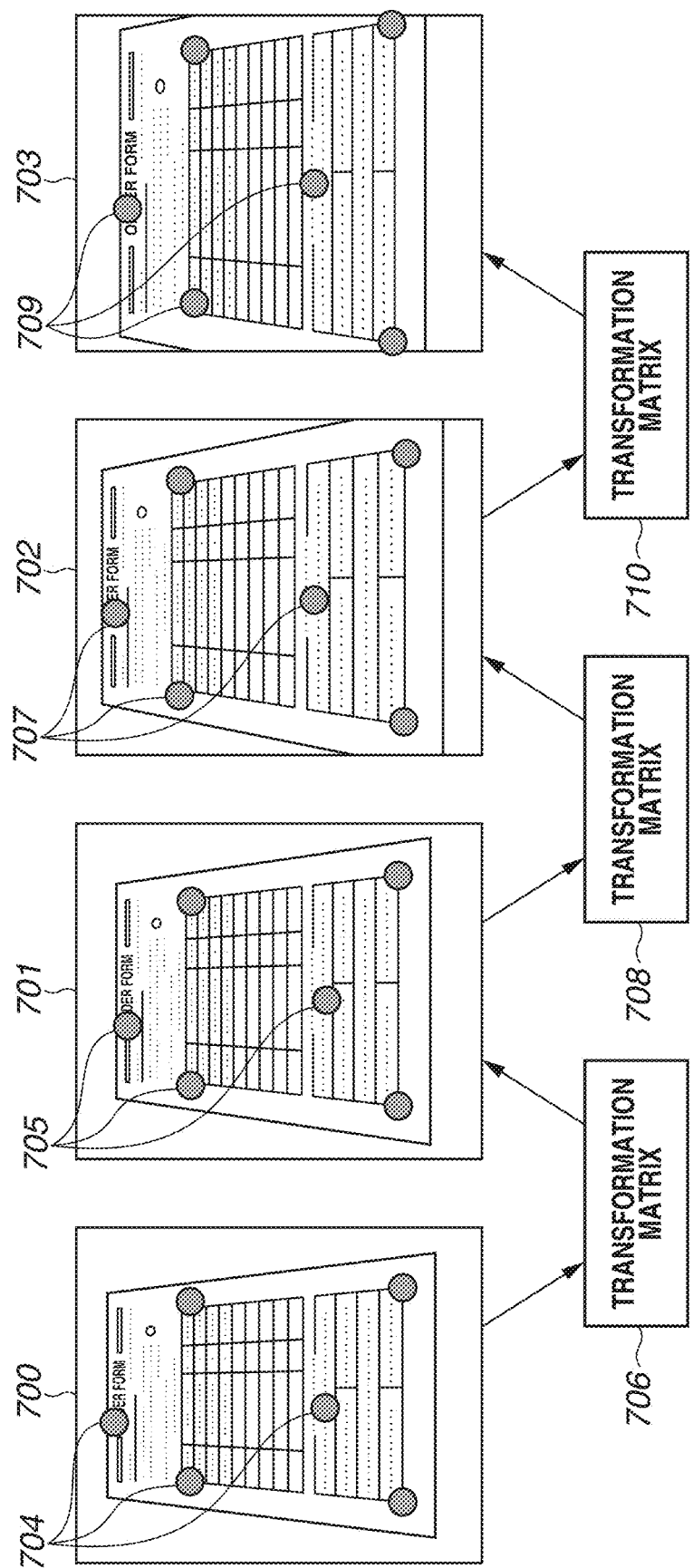
FIG. 7 illustrates an example of image position tracking processing.

In step S508, the feature point tracking processing unit 311 and the image position tracking processing unit 312 execute the feature point tracking processing and image position tracking processing, respectively. A specific example of the feature point tracking processing and image position tracking processing will be described below with reference to FIG. 7. While the transformation information for use in coordinate transformation between the two images will be described as "transformation matrix", as described above in the description of the image position tracking processing unit 312, the transformation information is not limited to the determinant expression and can be any other transformation equation or transformation information. Captured images 700 to 703 are captured images (moving images) acquired consecutively by the captured image acquisition unit 306. At the point when the first captured image 700 is acquired, the four sides of the document are not recognized yet, so that the captured image 700 is saved in step S510 after the four sides detection processing in step S503, the four sides information saving processing in step S507, etc. are performed. Next, the processing performed when the captured image 701 is acquired in step S501 will be described below. The feature point tracking processing unit 311 executes the feature point tracking processing (optical flow) on the immediately-previous captured image 700 (image saved in step S510) using a plurality of feature points 704 extracted by the feature amount extraction unit 309 to detect feature points 705 corresponding to the feature points 704 on the captured image 701. Then, the image position tracking processing unit 312 obtains a transformation matrix 706 using the feature points 704 and 705. The transformation matrix 706 is a transformation matrix for transforming a transformation target coordinate position from the coordinate system on the captured image 700 onto the coordinate system on the captured image 701, and multiplying a coordinate position on the captured image 700 by the transformation matrix 706 identifies the coordinate position on the captured image 701. Similarly, a transformation matrix 708 is obtained from the feature points 705 of the captured image 701 and feature points 707 of the captured image 702. Further, a transformation matrix 710 is obtained from the feature points 707 of the captured image 702 and feature points 709 of the captured image 703. The obtained transformation matrixes 706, 708, and 710 are multiplied to track the coordinate positions between the captured images. Thus, as described below, multiplying the four sides information (coordinate positions of the vertexes of the quadrilateral) detected from the captured image 700 by the transformation matrixes 706, 708, and 710 enables transformations to the coordinate systems on the captured images 701 to 703.

Figure 8:
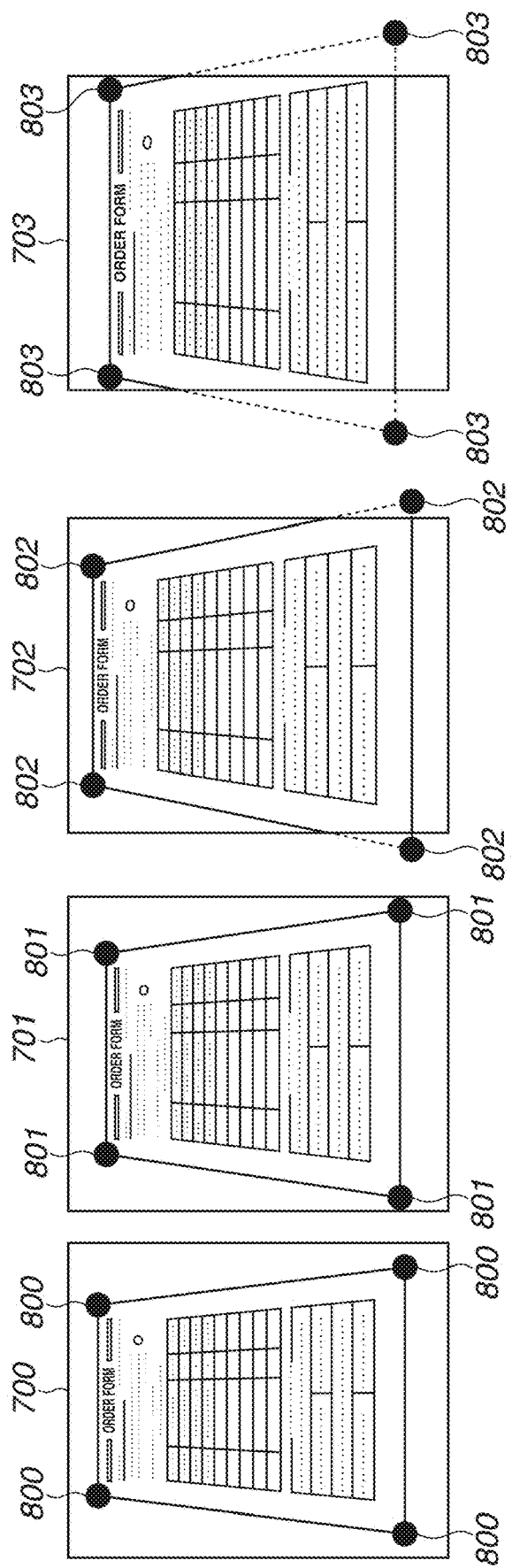
FIG. 8 illustrates an example of four sides information correction processing.

In step S509, the four sides information correction processing unit 313 executes four sides information correction processing. A specific example of the four sides information correction processing will be described below with reference to FIG. 8. The four sides information correction processing unit 313 multiplies four sides information 800 detected from the captured image 700 by the transformation matrix 706 obtained from the captured images 700 and 701 to transform the four sides information 800 into four sides information 801 on the coordinate system of the captured image 701. Specifically, four sides information on the previous captured image is corrected to four sides information on the next captured image by multiplying the four sides information on the coordinate system of the previous captured image by a transformation matrix between the images. Similarly, the four sides information 801 on the coordinate system of the captured image 701 is multiplied by the transformation matrix 708 to obtain four sides information 802 on the coordinate system of the captured image 702. Further, the four sides information 802 on the coordinate system of the captured image 702 is multiplied by the transformation matrix 710 to obtain four sides information 803 on the coordinate system of the captured image 703.

In step S510, the main control unit 303 temporarily saves, in the storage unit 307, the captured image for use in the image position tracking processing in step S508.

In step S511, the main control unit 303 determines whether an image capturing operation is performed by the user (whether an image capturing button or shutter is pressed). In a case where the main control unit 303 determines that an image capturing operation is performed (YES in step S511), the processing proceeds to step S512. On the other hand, in a case where the main control unit 303 determines that no image capturing operation is performed (NO in step S511), the processing returns to step S501.

In step S512, the distortion correction processing unit 314 executes distortion correction processing. The distortion correction processing unit 314 calculates distortion correction information (distortion correction parameter) based on the four sides information transformed to the coordinate system of the captured image at the time of execution of the image capturing operation and the output image size information (form size information), and performs the distortion correction processing using the distortion correction information. Taking into consideration a case in which the quadrilateral region is distorted into a trapezoid, the distortion correction information (distortion correction parameter) is a projection transformation matrix. The projection transformation matrix can be calculated using a publicly-known method based on the four sides information transformed to the coordinate system of the captured image and the output image size information. In a case in which the processing speed is prioritized, the projection transformation matrix can be calculated using an Affine transformation matrix or simple magnification as distortion correction information. If the distortion correction information is determined, the distortion correction processing unit 314 performs the distortion correction processing on the partial image in the quadrilateral region of the captured image to output an image obtained as a result of removing only the inside of the quadrilateral region from the inside of the captured image.

Figure 9A:
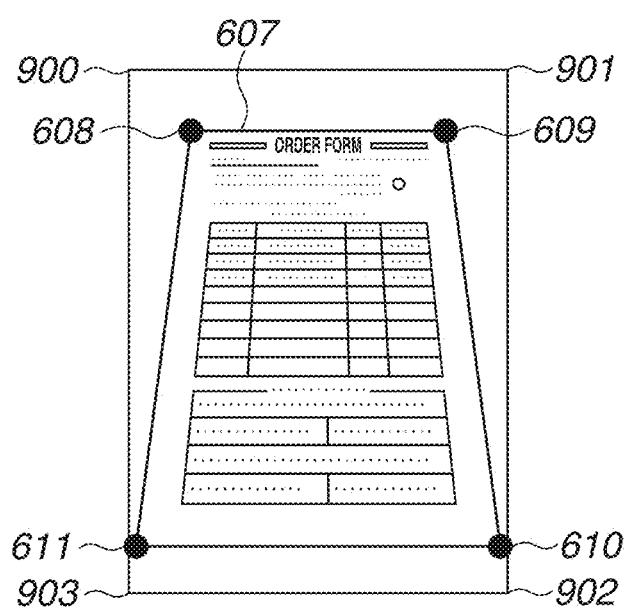
FIGS. 9A, 9B, 9C, and 9D illustrate an example of distortion correction processing.
Figure 9B:
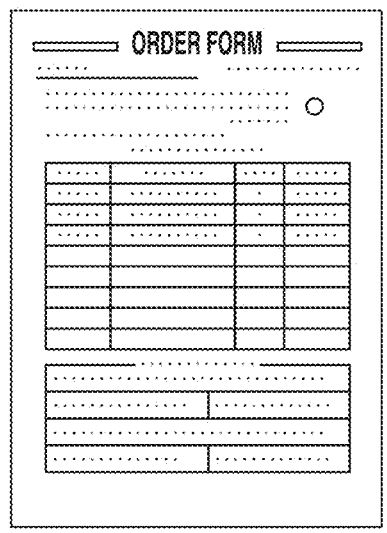
Figure 9C:
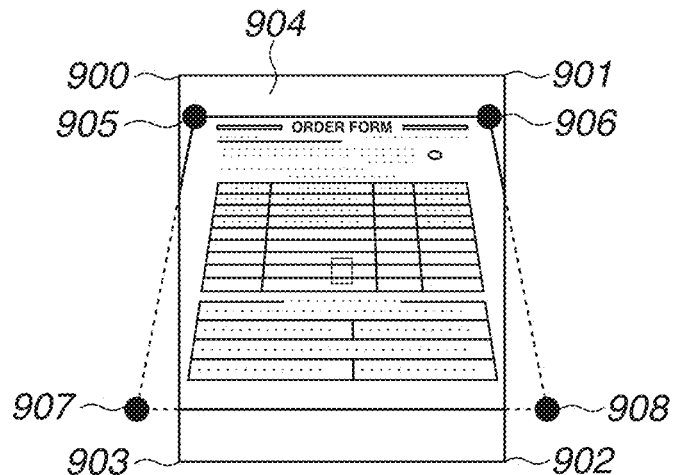
Figure 9D:
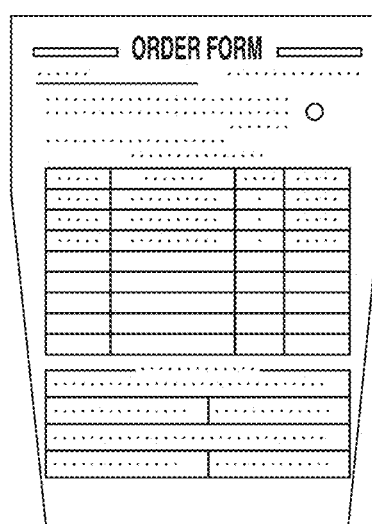

A specific example of the distortion correction processing will be described below with reference to FIGS. 9A to 9D. The first distortion correction information (distortion correction parameter) is calculated based on the four sides information (vertexes 608, 609, 610, and 611) corresponding to the quadrilateral region 607 on the coordinate system of the captured image in FIG. 9A and the size information (900, 901, 902, and 903) about the image to be output. Then, the calculated first distortion correction information is applied to the captured image in FIG. 9A to perform the distortion correction processing, and an example of an output result thereof is as illustrated in FIG. 9B. Similarly, second distortion correction information (distortion correction parameter) is calculated based on the four sides information (vertexes 905, 906, 907, and 908) transformed to the coordinate system of a captured image 904 in FIG. 9C and the size information (900, 901, 902, and 903) about the image to be output. Then, the calculated second distortion correction information is applied to the captured image 904 to perform the distortion correction processing, and an example of an output result thereof is as illustrated in FIG. 9D.

As described above, in the present exemplary embodiment, an image of a document is captured as a first captured image such that the image contains the entire document before a camera is brought near the document, and four sides information (i.e., information for use in the distortion correction on the first captured image) about the document is extracted based on the first captured image. Further, if a second captured image which does not contain the entire document is acquired when the image capturing is performed with the camera brought near the document, one transformation matrix or a plurality of transformation matrixes for performing the coordinate transformation between the first and second captured images (i.e., transformation information for performing the coordinate transformation) is obtained. Then, the four sides information on the first captured image is transformed into the four sides information on the coordinate system of the second captured image using the obtained transformation information (transformation matrix) for performing the coordinate transformation. Further, second distortion correction information is calculated based on the four sides information on the coordinate system of the second captured image, and the distortion correction is performed on the second captured image based on the calculated second distortion correction information.

In a second exemplary embodiment, processing for resetting four sides information errors accumulated as a result of continuous multiplication of transformation matrixes between a plurality of captured images will be described below. Detailed description of the configurations and flowcharts that are already described above in the first exemplary embodiment is omitted.

The accuracy of the transformation matrixes calculated by the image position tracking processing unit 312 in the first exemplary embodiment is not 100% due to an effect of estimation errors, etc. in the feature point tracking processing by the feature point tracking processing unit 311. Thus, if the sequential multiplication of a plurality of transformation matrixes obtained between a plurality of captured images is continued, the four sides information errors are accumulated to increase gradually.

Figure 10:
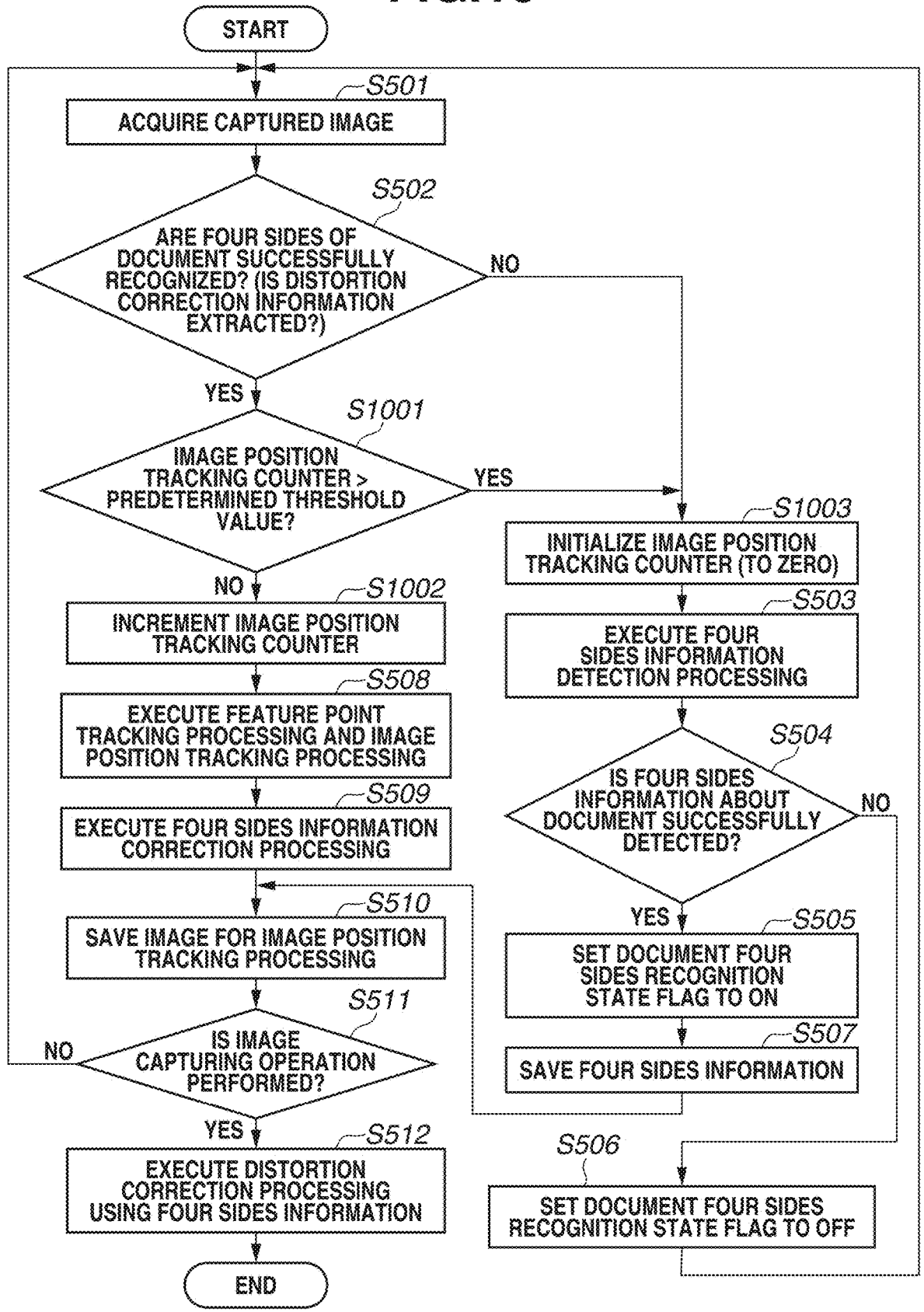
FIG. 10 illustrates a flowchart of document distortion correction processing.

A flowchart of document distortion correction processing in the second exemplary embodiment will be described below with reference to FIG. 10. The flowchart illustrated in FIG. 10 includes the processing of resetting accumulated errors in addition to the flowchart in the first exemplary embodiment which is illustrated in FIG. 5. Description of the steps that are common to FIGS. 5 and 10 is omitted, and the steps that are added in FIG. 10 will be described below.

In step S502, in a case where the main control unit 303 determines that the four sides are successfully recognized (YES in step S502), then in step S1001, the main control unit 303 determines whether an image position tracking counter which indicates the number of times the four sides information is multiplied by a transformation matrix is greater than a predetermined threshold value. In a case where the main control unit 303 determines that the image position tracking counter is not greater than the predetermined threshold value (NO in step S1001), the processing proceeds to step S1002. On the other hand, in a case where the main control unit 303 determines that the image position tracking counter is greater than the predetermined threshold value (YES in step S1001), the processing proceeds to step S1003.

In step S1002, the main control unit 303 increments the image position tracking counter by one, and the processing proceeds to step S508.

In step S1003, the main control unit 303 initializes the image position tracking counter (resets the counter to zero), and the processing proceeds to step S503.

As described above, in the second exemplary embodiment, control is performed such that the four sides detection processing in step S503 is re-executed to reset an accumulated error in a case where the number of times a transformation matrix is multiplied exceeds a predetermined number of times.

As described above in the second exemplary embodiment, control is performed such that the four sides detection processing is re-executed to reset an accumulated error in a case where the number of times a transformation matrix is multiplied exceeds the predetermined number of times, but if the four sides detection processing is performed with the four sides of the document displaced from the viewing angle of the camera 104, the possibility that the four sides of the document are erroneously recognized becomes high. Thus, in a third exemplary embodiment, the operation of resetting an accumulated error is not performed in a case where it is determined that the four sides of a document are displaced from a captured image. Detailed description of the configurations and flowcharts that are already described above in the first and the second exemplary embodiments is omitted.

Figure 11:
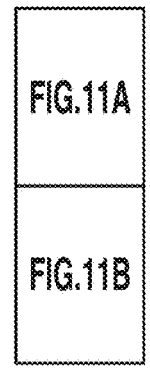
FIG. 11, composed of FIG. 11A and FIG. 11B, illustrates a flowchart of document distortion correction processing.
Figure 11A:
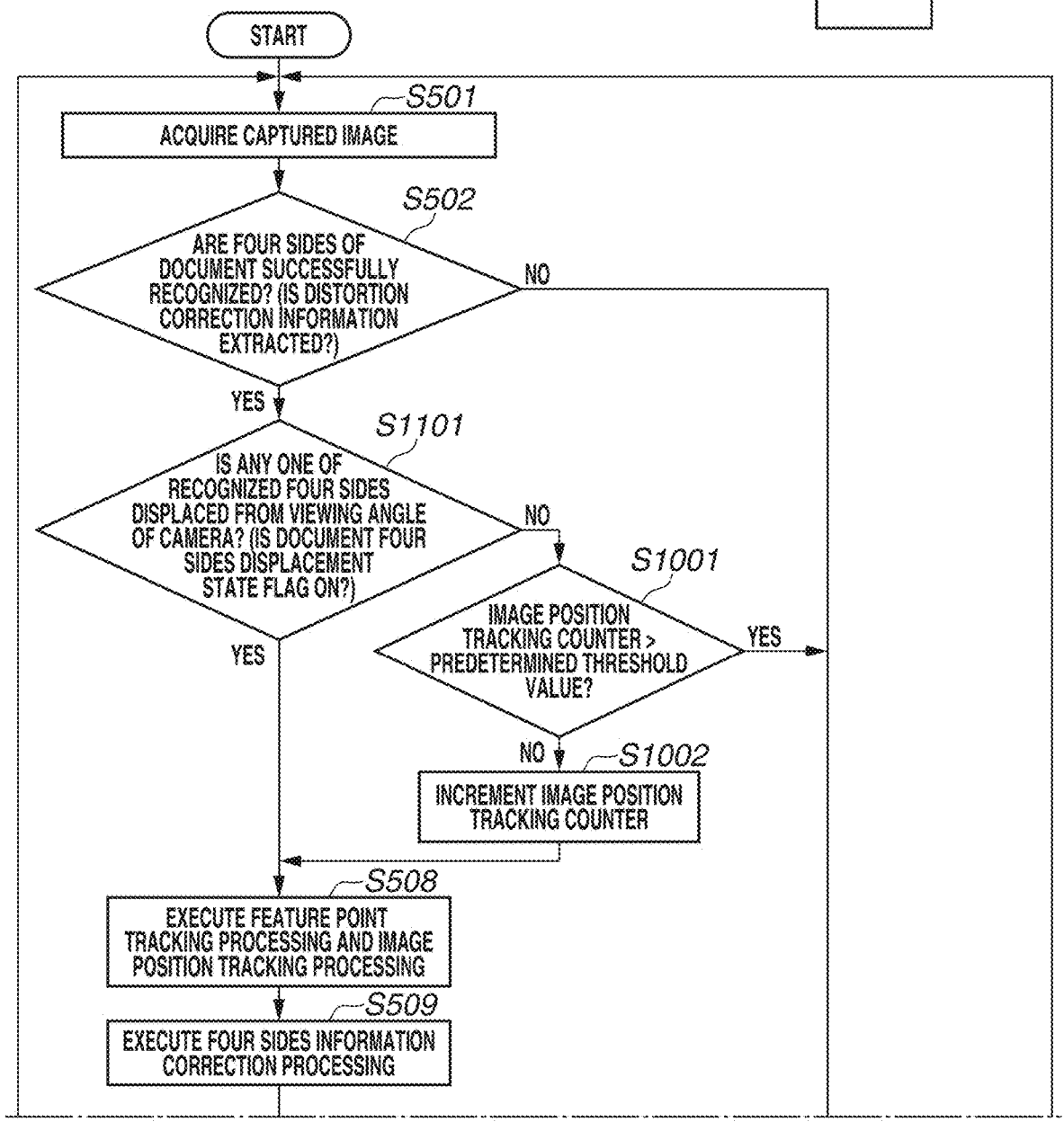
Figure 11B:
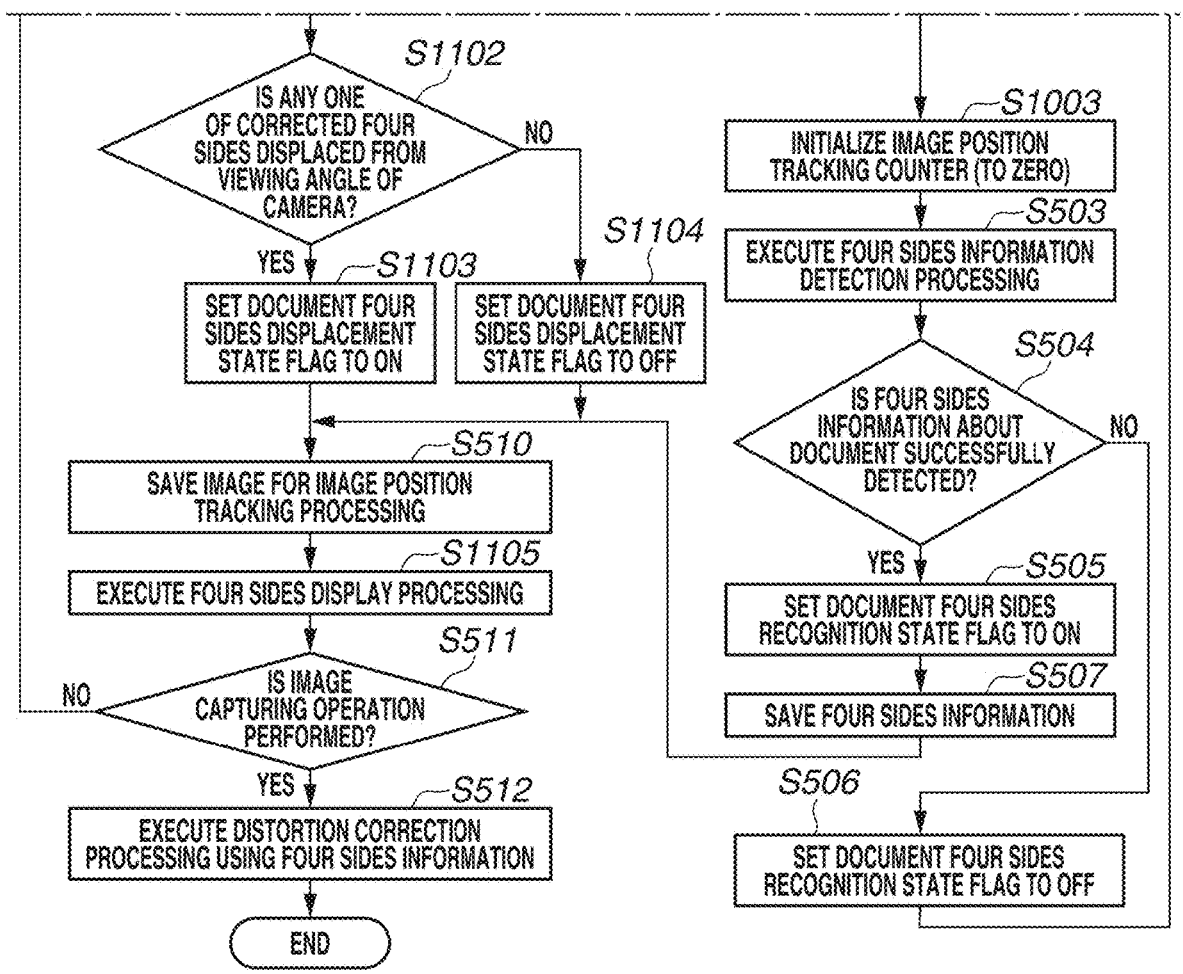

A flowchart of document distortion correction processing in the third exemplary embodiment will be described below with reference to FIG. 11.

In step S502, in a case where the main control unit 303 determines that the four sides are successfully recognized (YES in step S502), then in step S1101, the main control unit 303 determines whether a document four sides displacement state flag is ON (i.e., whether any one of the four sides of the document region is displaced from the image capturing viewing angle). In a case where the document four sides displacement state flag is ON (YES in step S1101), the main control unit 303 determines that one or more of the four sides of the document are displaced, and the processing proceeds to step S508. On the other hand, in a case where the document four sides displacement state flag is OFF (NO in step S1101), the main control unit 303 determines that none of the four sides of the document is displaced, and the processing proceeds to step S1001.

In step S1102, the main control unit 303 determines whether any one of the four sides of the document that are corrected in step S509 is displaced from the viewing angle of the captured image using the coordinates of the vertexes after the transformation performed using the transformation matrixes. In a case where the main control unit 303 determines that at least one of the four sides of the document is displaced (YES in step S1102), the processing proceeds to step S1103, and the document four sides displacement state flag is set to ON. On the other hand, in a case where the main control unit 303 determines that none of the four sides of the document region is displaced (NO in step S1102), the processing proceeds to step S1104, and the document four sides displacement state flag is set to OFF. For example, as to the four sides information 800 and the four sides information 801 in FIG. 8, the vertexes (upper left vertex, upper right vertex, lower right vertex, and lower left vertex) of the document region are within the viewing angle of the camera viewing angle, so that it is determined that the four sides of the document region are not displaced. As to the four sides information 802 and the four sides information 803 in FIG. 8, the lower left vertex and the lower right vertex are displaced from the viewing angle of the camera, so that it is determined that the four sides of the document are displaced.

Figure 12C:
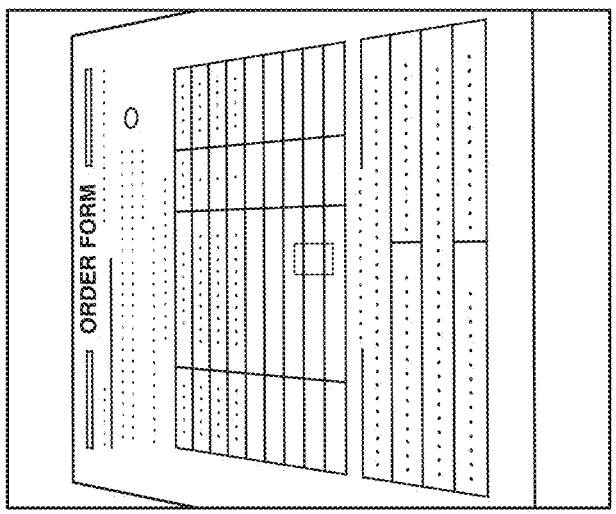
FIGS. 12A, 12B, and 12C illustrates an example of a four sides display UI.
Figure 12B:
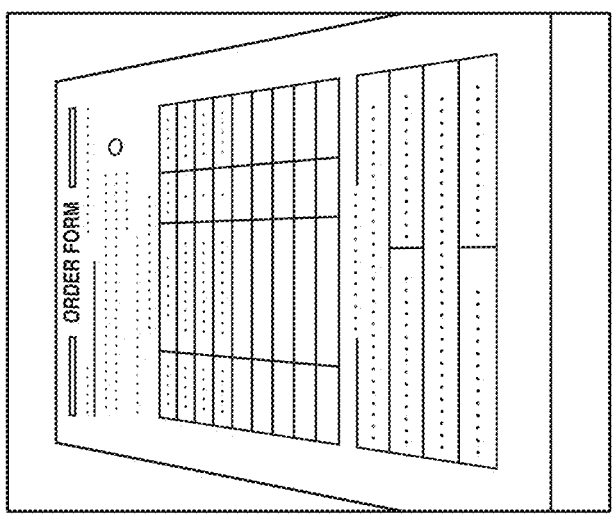
Figure 12A:
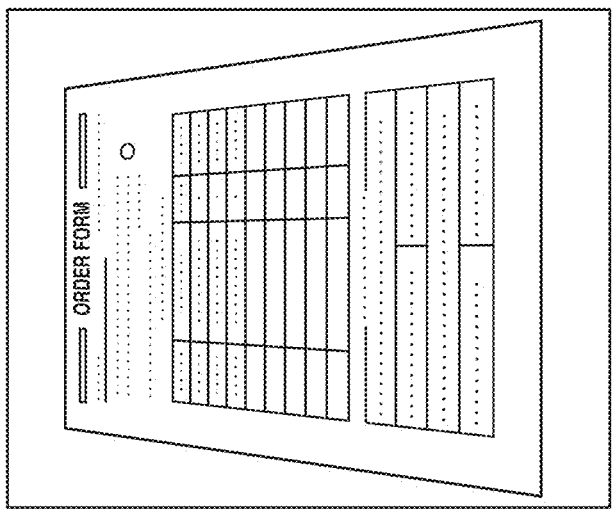

In step S1105, the main control unit 303 executes four sides display processing to superimpose and display on the captured image the four sides information transformed using the transformation matrix. A specific example of the four sides display processing will be described below with reference to FIGS. 12A to 12C. The main control unit 303 displays, on the mobile terminal screen 400, an image formed by overlaying lines of the four sides on the captured image using the four sides information detected in step S503 or the four sides information corrected in step S509. FIG. 12A illustrates an example of the case in which the four sides are displayed on the captured image 701 based on the four sides information 801 in FIG. 8. FIG. 12B illustrates an example of the case in which the four sides are displayed on the captured image 702 based on the four sides information 802 in FIG. 8. FIG. 12C illustrates an example of the case in which the four sides are displayed on the captured image 703 based on the four sides information 803 in FIG. 8.

As described above, in the third exemplary embodiment, it is determined that the four sides of a document are displaced from the viewing angle of the camera, in a case where the predetermined condition that the coordinates of the vertexes of the four sides of the document, which are corrected, correspond to positions outside the captured image is satisfied. Then, if it is determined that the four sides of the document are displaced from the viewing angle of the camera, control is performed such that the operation of resetting an accumulated error (four sides detection processing of detecting the four sides of the document in step S503) is not re-executed, whereby the possibility that the four sides are erroneously recognized can be reduced.

In a fourth exemplary embodiment, the processing of resetting the four sides information errors accumulated as a result of repetition of multiplication of the transformation matrix when the four sides of the document region are displaced from the viewing angle of the camera will be described. Detailed description of the configurations and flowcharts that are already described above in the first to third exemplary embodiments is omitted.

Figure 13:
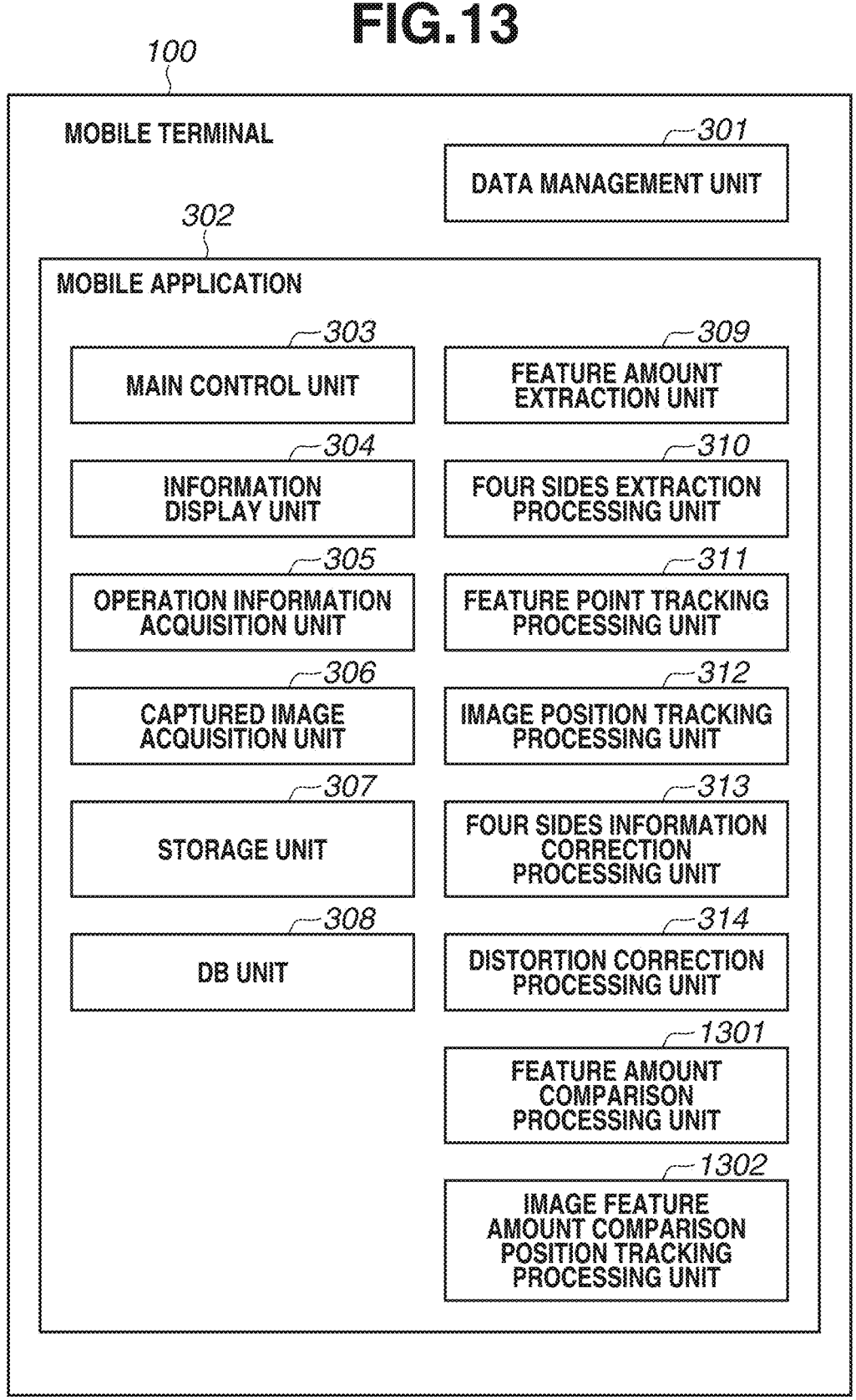
FIG. 13 illustrates an example of a second software configuration of the mobile terminal.

FIG. 13 illustrates an example of a software configuration of the mobile terminal 100 in the fourth exemplary embodiment.

A feature amount comparison processing unit 1301 executes feature amount comparison processing to compare feature amounts extracted respectively from two different images by the feature amount extraction unit 309. The feature amount comparison processing compares feature points of images and feature amounts of the feature points to obtain (match) a combination of corresponding feature points between the images. Further, use of a method of excluding outliers to estimate regularity, such as random sample consensus (RANSAC), makes it possible to eliminate a combination of feature points that is likely to be noise so that the matching is performed with greater accuracy.

An image feature amount comparison position tracking processing unit 1302 performs positioning between images by calculating a homography transformation matrix (hereinafter, "transformation matrix") for performing homography transformation (homography transform, plane projection transformation) between the feature points on first and second images matched by the feature amount comparison processing.

Figure 14:
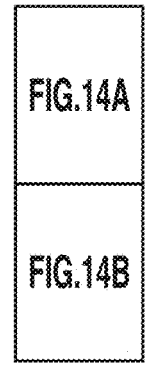
FIG. 14, composed of FIG. 14A and FIG. 14B, illustrates a sequence of document distortion correction processing.
Figure 14A:
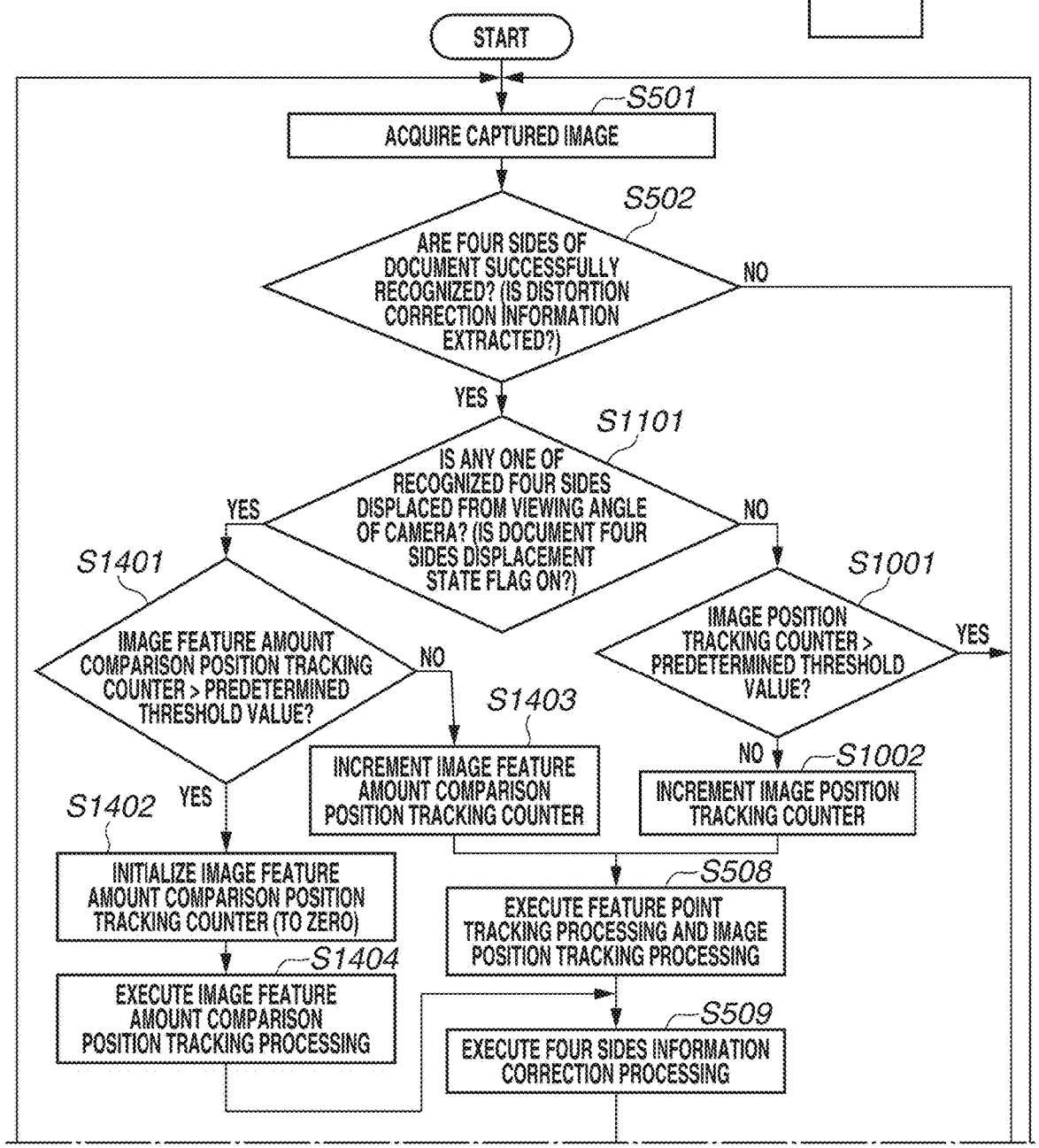
Figure 14B:
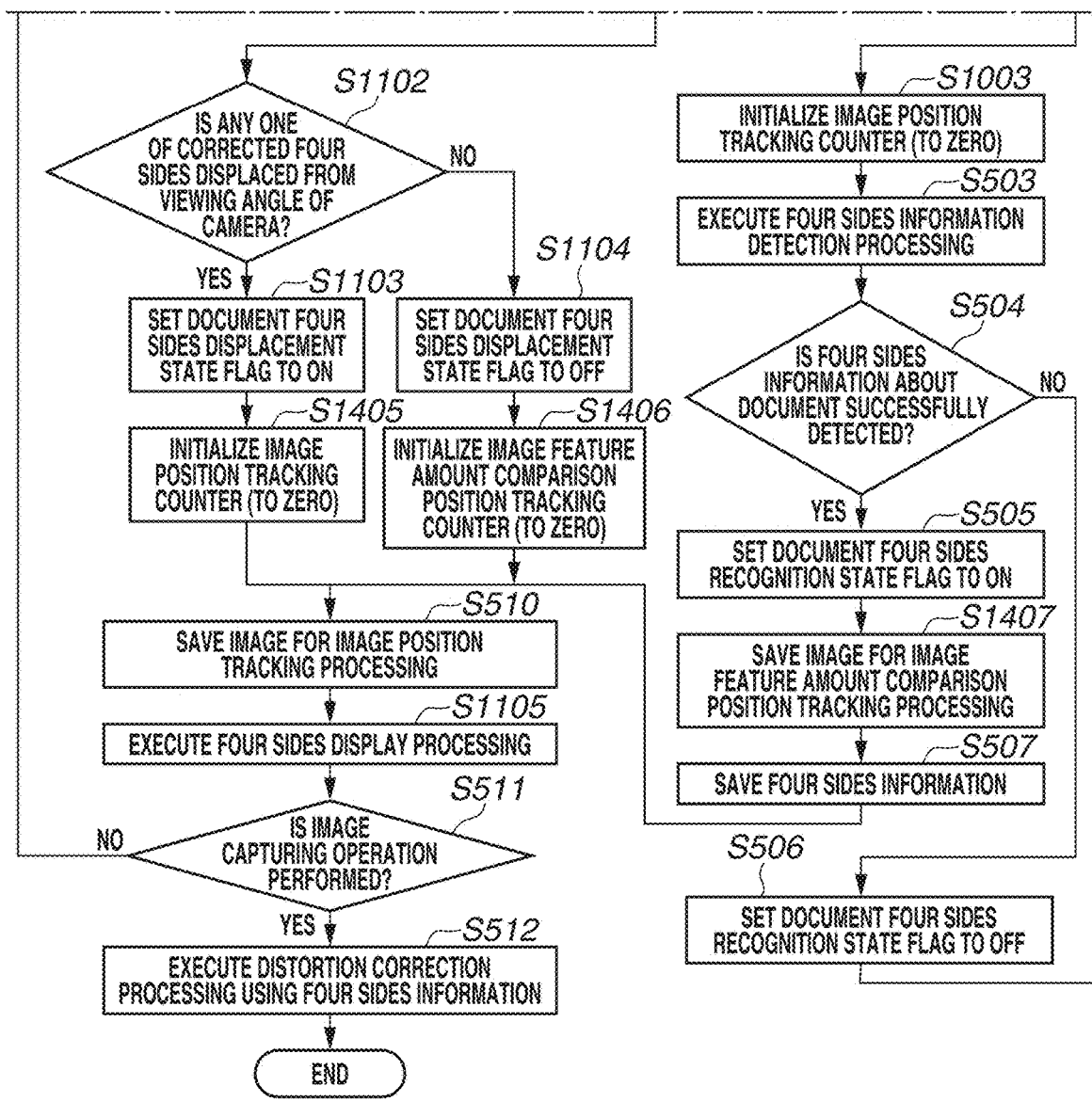

A flowchart of document distortion correction processing in the fourth exemplary embodiment will be described below with reference to FIG. 14.

In step S1401, the main control unit 303 determines whether the document displacement state flag is ON and an image feature amount comparison position tracking counter indicating the number of times the four sides information is multiplied by a transformation matrix is greater than a predetermined threshold value. In a case where the main control unit 303 determines that the image feature amount comparison position tracking counter is not greater than the predetermined threshold value (NO in step S1401), the processing proceeds to step S1403. On the other hand, in a case where the main control unit 303 determines that the image feature amount comparison position tracking counter is greater than the predetermined threshold value (YES in step S1401), the processing proceeds to step S1402.

In step S1402, the main control unit 303 initializes an image feature amount comparison image position tracking counter (resets the counter to zero).

In step S1403, the main control unit 303 increments the image feature amount comparison image position tracking counter by one.

Figure 15:
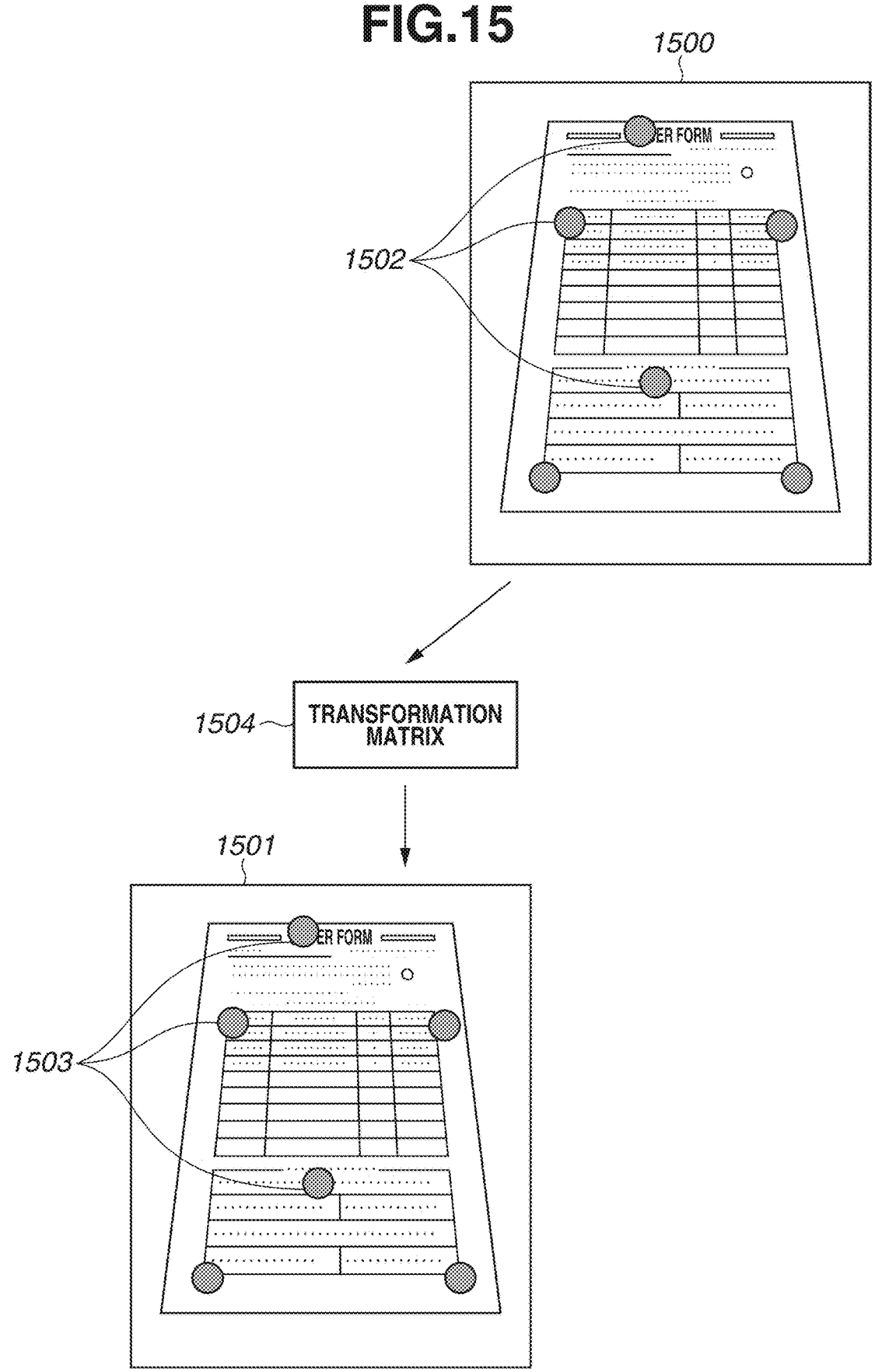
FIG. 15 illustrates image feature amount comparison position tracking processing.

The image feature amount comparison position tracking processing in step S1404 will be described below with reference to FIG. 15. First, the feature amount comparison processing unit 1301 extracts feature amounts 1502 and 1503 respectively from an image 1500 (image saved in step S1407 described below) from which four sides are successfully detected and a captured image 1501, using the feature amount extraction unit 309, and performs processing to compare the feature amounts. Further, the feature amount comparison processing unit 1301 calculates a transformation matrix 1504 using the feature amounts 1502 and 1503. The transformation matrix 1504 is a transformation matrix for transforming coordinate positions from the coordinate system on the image 1500, from which four sides are successfully detected, to the coordinate system on the captured image 1501. A coordinate position on the image 1500 from which four sides are successfully detected is multiplied by the transformation matrix to identify the coordinate position on the captured image 1501.

There are two ways of tracking processing, the tracking processing by the image position tracking processing unit 312 in step S508 and the tracking processing by the image feature amount comparison position tracking processing unit 1302 in step S1404. In the tracking processing by the image position tracking processing unit 312, transformation matrixes obtained between a plurality of captured images are multiplied to accumulate errors in the four sides information, but the processing speed is high. On the other hand, in the tracking processing by the image feature amount comparison position tracking processing unit 1302, a captured image (comparison target image) is always compared with the first original image to prevent error accumulation, but the processing is very slow. Thus, the flowchart uses the tracking processing by the image position tracking processing unit 312 and the tracking processing by the image feature amount comparison position tracking processing unit 1302 in combination.

In step S1405, the main control unit 303 initializes the image position tracking counter (resets the counter to zero).

In step S1406, the main control unit 303 initializes the image feature amount comparison image position tracking counter (resets the counter to zero).

In step S1407, the main control unit 303 temporarily saves in the storage unit 307 the captured image for the image feature amount comparison position tracking processing (step S1404).

As described above, in the fourth exemplary embodiment, the image position tracking processing and the image feature amount comparison position tracking processing are performed in combination to reduce an accumulation of the four sides information errors, even when the four sides of the document region are displaced from the viewing angle of the camera 104.

In the first exemplary embodiment, the four sides of a document are detected based on a captured image of the entire document, and information about the four sides is transformed into the coordinate system of a captured image obtained by enlarging a part of the document and performing image capturing. Then, the distortion correction is performed using the transformed four sides information. A fifth exemplary embodiment in which a distortion correction parameter is calculated will be described below. For example, the distortion correction parameter is calculated using information about parallel lines and character base lines in the captured image of the entire document, and the distortion correction parameter is transformed onto the coordinate system of a captured enlarged image of a portion of the document using transformation matrixes to perform distortion correction using the transformed distortion correction parameter.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-128039, filed Jun. 29, 2017, which is hereby incorporated by reference herein in its entirety.

What is claimed is:

1. An information processing apparatus comprising:
at least one processor; and
at least one memory that stores instructions, wherein the at least one processor executes the instructions to perform:
detecting four sides of a document image from a first captured image to obtain first coordinate information about vertexes of four sides on a first coordinate system of the first captured image;
calculating transformation information for use in coordinate transformation between coordinate systems of respective two different captured images based on feature points on the respective two different captured images;
transforming the obtained first coordinate information about the vertexes on the first coordinate system into second coordinate information about vertexes on a second coordinate system of a second captured image using the calculated transformation information; and
executing a distortion correction on the second captured image based on the transformed second coordinate information about the vertexes on the second coordinate system,
wherein, in a case where one captured image or a plurality of captured images exists between the first captured image and the second captured image, transformation information between the respective captured images are calculated and the first coordinate information are transformed into the second coordinate information by sequentially multiplying the calculated transformation information between the respective captured images, and
wherein the detecting to obtain the first coordinate information is re-performed in a case where a number of times the transformation information between the respective captured images is multiplied exceeds a predetermined number of times.

2. The information processing apparatus according to claim 1, wherein the processor executes the instructions to further perform controlling such that the detecting to obtain the first coordinate information is not re-performed in a case where the transformed second coordinate information satisfies a predetermined condition.

3. A non-transitory storage medium on which is stored a computer program for making a computer to perform:
detecting four sides of a document image from a first captured image to obtain first coordinate information about vertexes of four sides on a first coordinate system of the first captured image;
calculating transformation information for use in coordinate transformation between coordinate systems of respective two different captured images based on feature points on the respective two different captured images;
transforming the obtained first coordinate information about the vertexes on the first coordinate system into second coordinate information about vertexes on a second coordinate system of a second captured image using the calculated transformation information; and executing a distortion correction on the second captured image based on the transformed second coordinate information about the vertexes on the second coordinate system, wherein, in a case where one captured image or a plurality of captured images exists between the first captured image and the second captured image, transformation information between the respective captured images are calculated and the first coordinate information are transformed into the second coordinate information by sequentially multiplying the calculated transformation information between the respective captured images, and wherein the detecting to obtain the first coordinate information is re-performed in a case where a number of times the transformation information between the respective captured images is multiplied exceeds a predetermined number of times.

4. The non-transitory storage medium according to claim 3, wherein the processor executes the instructions to further perform controlling such that the detecting to obtain the first coordinate information is not re-performed in a case where the transformed second information satisfies a predetermined condition.

* * * * *